(12) United States Patent  
Gu et al.

(10) Patent No.: US 9,331,594 B2  
(45) Date of Patent: May 3, 2016

(54) CONVERSION SYSTEM FOR CONVERTING DIRECT CURRENT INTO ALTERNATING CURRENT

(71) Applicant: The Boeing Company, Chicago, IL (US)

(72) Inventors: Dazhong Gu, Brooklyn, NY (US); Qingquan Tang, Kingston, PA (US); Dariusz Czarkowski, South Setauket, NY (US); Francisco de Leon, Ridgewood, NJ (US); Kamiar J. Karimi, Kirkland, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 54 days.

(21) Appl. No.: 14/163,237

(22) Filed: Jan. 24, 2014

(65) Prior Publication Data

US 2015/0214854 A1 Jul. 30, 2015

(51) Int. Cl.
*H02M 5/458* (2006.01)
*H02M 1/08* (2006.01)

(52) U.S. Cl.
CPC .............. *H02M 5/458* (2013.01); *H02M 1/08* (2013.01)

(58) Field of Classification Search
CPC  H02M 7/53871; H02M 7/5387; H02M 7/493
USPC .......... 363/16–20, 49, 71–76, 95, 97, 98, 132
See application file for complete search history.

(56) References Cited

U.S. PATENT DOCUMENTS

| | | | |
|---|---|---|---|
| 5,740,090 A | 4/1998 | Steinbuch et al. | |
| 6,154,378 A * | 11/2000 | Peterson | H02M 5/458 363/132 |
| 6,388,904 B2 * | 5/2002 | Nomura | H02M 3/33569 363/132 |
| 7,468,649 B2 | 12/2008 | Chandrasekaran | |
| 7,518,886 B1 * | 4/2009 | Lai et al. | 363/17 |
| 7,746,041 B2 | 6/2010 | Xu et al. | |
| 7,830,686 B2 | 11/2010 | Zeng et al. | |
| 7,904,495 B2 | 3/2011 | Ramos et al. | |
| 8,072,785 B2 * | 12/2011 | Nakahori | H02M 3/33561 363/17 |
| 8,472,220 B2 * | 6/2013 | Garrity | H02M 7/46 307/45 |
| 8,964,432 B2 * | 2/2015 | Tang | H02M 7/48 363/71 |
| 2007/0258273 A1 | 11/2007 | Engelage | |
| 2012/0106210 A1 | 5/2012 | Xu et al. | |
| 2012/0275201 A1 | 11/2012 | Koyama et al. | |
| 2012/0313431 A1 | 12/2012 | Shum et al. | |
| 2013/0300380 A1 | 11/2013 | Brunotte et al. | |

(Continued)

OTHER PUBLICATIONS

Tang et al., "Three-Phase Inverter with a Repositioned Choke," USPTO U.S. Appl. No. 14/163,328, filed Jan. 24, 2014, 46 pages.

(Continued)

*Primary Examiner* — Rajnikant Patel
(74) *Attorney, Agent, or Firm* — Yee & Associates, P.C.

(57) ABSTRACT

A method and apparatus for converting direct current into alternating current. An initial voltage level of an input voltage source is changed using a dual converter to form a plurality of voltage sources. Each of the plurality of voltage sources has voltage levels different from the initial voltage level. An inverter is supplied direct current from the plurality of voltage sources formed by the dual converter. The direct current is converted into a number of alternating currents using the inverter.

17 Claims, 10 Drawing Sheets

(56) References Cited

U.S. PATENT DOCUMENTS

2014/0191823 A1  7/2014  Otsubo
2015/0214832 A1  7/2015  Tang et al.

OTHER PUBLICATIONS

Wang et al., "System and Methods for High Power DC/DC Converter," USPTO U.S. Appl. No. 13/251,527, filed Oct. 3, 2011, 32 pages.

Tang et al., "Apparatus and Method for Controlling Circulating Current in an Inverter System," USPTO U.S. Appl. No. 13/752,813, filed Jan. 29, 2013, 40 pages.

Tang et al., "Power System Having Repetitive Control in Symmetric Sequences with Harmonics Cancellation," USPTO U.S. Appl. No. 13/794,397, filed Mar. 11, 2013, 53 pages.

Asiminoaei et al., "Shunt Active-Power-Filter Topology Based on Parallel Interleaved Inverters," IEEE Transactions on Industrial Electronics, Bol. 55, No. 3, Mar. 2008, pp. 1175-1189.

Borup et al., "Sharing of Nonlinear Load in Parallel-Connected Three-Phase Converters," IEEE Transactions on Industry Applications, vol. 37, No. 6, Dec. 2001, pp. 1817-1823.

Cougo et al., "Parallel Three-Phase Inverters: Optimal Pwm Method for Flux Reduction in Intercell Transformers," IEEE Transactions on Power Electronics, vol. 26, No. 8, Aug. 2011, pp. 2184-2191.

Brabandere et al., "A Voltage and Frequency Droop Control Method for Parallel Inverters," IEEE Transactions on Power Electronics, vol. 22, No. 4, Jul. 2007, pp. 1107-1115.

Forest et al., "Optimization of the Supply Voltage System in Interleaved Converters Using Intercell Transformers," IEEE Transactions on Power Electronics, vol. 22, No. 3, May 2007, pp. 934-942.

Forest et al., "Design and Comparison of Inductors and Intercell Transformers for Filtering of PWM Inverter Output," IEEE Transactions on Power Electronics, vol. 24, No. 3, Mar. 2009, pp. 812-821.

Laboure et al., "A Theoretical Approach to InterCell Transformers, Application to Interleaved Converters," IEEE Transactions on Power Electronics, vol. 23, No. 1, Jan. 2008, pp. 464-474.

Le Bolloch et al., "Current-sharing control technique for interleaving VRMs using intercell transformers," 13th European Conference on Power Electronics and Applications, Sep. 2009, 10 pages.

Sun et al., "Modeling, Analysis, and Implementation of Parallel Multi-Inverter Systems With Instantaneous AverageCurrent-Sharing Scheme," IEEE Transactions on Power Electronics, vol. 18, No. 3, May 2003, pp. 844-856.

Chew et al., "Digital Control of Repetitive Errors in Disk Drive Systems," IEEE Control Systems Magazine, vol. 10, No. 1, Jan. 1990, pp. 16-20.

Costa-Castello et al., "Odd-Harmonic Digital Repetitive Control of a Single-Phase Current Active Filter," IEEE Transactions on Power Electronics, vol. 19, No. 4, Jul. 2004, pp. 1060-1068.

Demirkutlu et al., "A Scalar Resonant-Filter-Bank-Based Output-Voltage Control Method and a Scalar Minimum-Switching-Loss Discontinuous PWM Method for the Four-Leg-Inverter-Based Three-Phase Four-Wire Supply," IEEE Transactions on Industry Applications, vol. 45, No. 3, Jun. 2009, pp. 982-991.

Kim et al., "A Carrier-Based PWM Method for Three-Phase Four-Leg Voltage Source Converters," IEEE Transactions on Power Electronics, vol. 19, No. 1, Jan. 2004, pp. 66-75.

Mohd et al., "Control strategy and space vector modulation for three-leg four-wire voltage source inverters under unbalanced load conditions," The Institution of Engineering and Technology, IET Power Electron, vol. 3, No. 3, copyright 2010, pp. 323-333.

Vechiu et al., "Transient Operation of a Four-Leg Inverter for Autonomous Applications With Unbalanced Load," IEEE Transactions on Power Electronics, vol. 25, No. 2, Feb. 2010, pp. 399-407.

Zhou et al., "Plug-In Dual-Mode-Structure Repetitive Controller for CVCF PWM Inverters," IEEE Transactions on Industrial Electronics, vol. 56, No. 3, Mar. 2009, pp. 784-791.

Ryan et al., "Decoupled Control of a Four-Leg Inverter via a New 4x4 Transformation Matrix," IEEE Transactions on Power Electronics, vol. 16, No. 5, Sep. 2001, pp. 694-701.

Zhang et al., "Direct Repetitive Control of SPWM Inverter for UPS Purpose," IEEE Transactions on Power Electronics, vol. 18, No. 3, May 2003, pp. 784-792.

Zhang et al., "Three-Dimensional Space Vector Modulation for Four-Leg Voltage-Source Converters," IEEE Transactions on Power Electronics, vol. 17, No. 3, May 2002, pp. 314-326.

Zhou et al., "Digitial Repetitive Learning Controller for Three-Phase CVCF PWM Inverter," IEEE Transactions on Industrial Electronics, vol. 48, No. 4, Aug. 2001, pp. 820-830.

Office Action, dated Nov. 25, 2015, regarding U.S. Appl. No. 14/163,328, 16 pages.

* cited by examiner

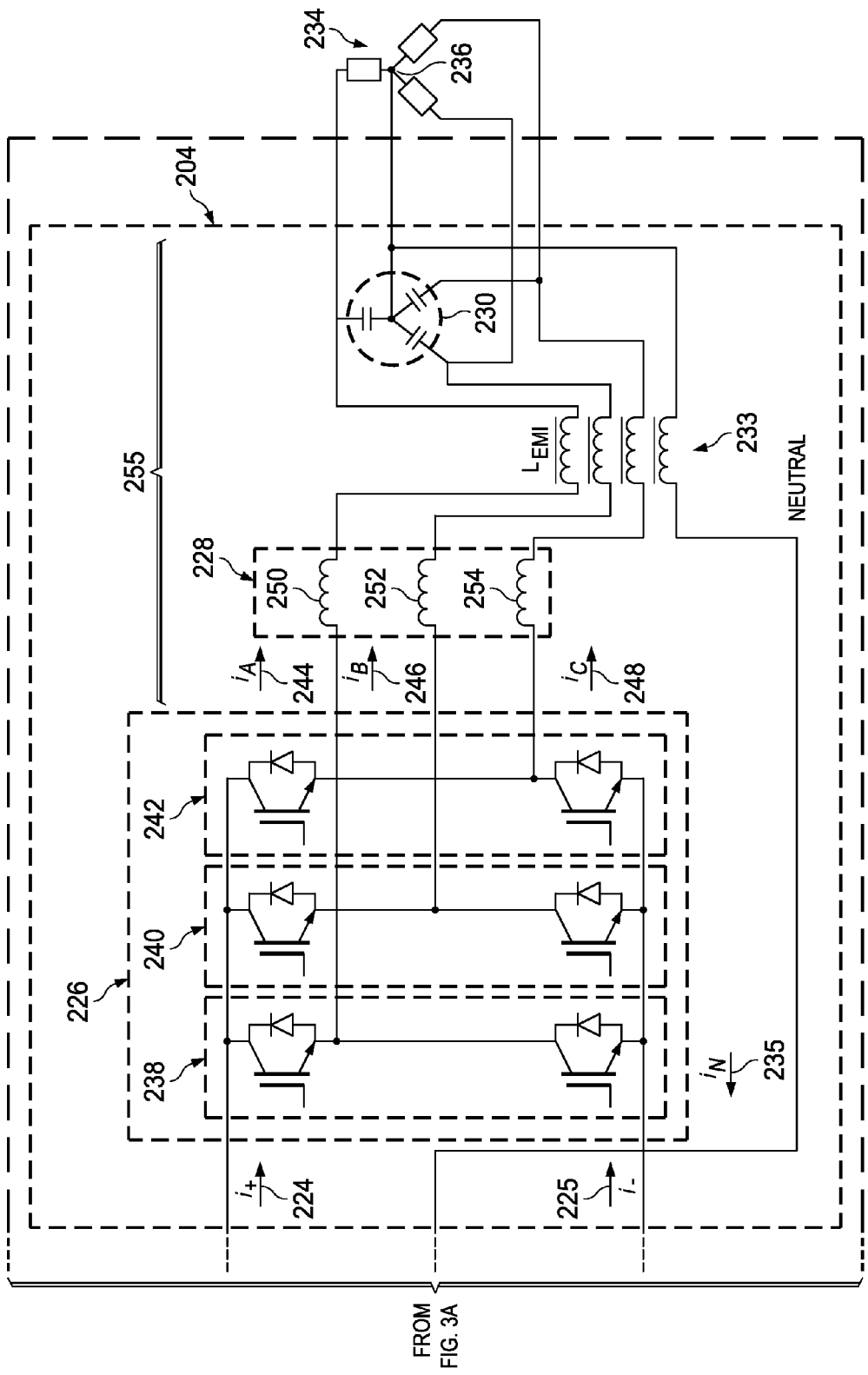

CONVERSION SYSTEM FOR CONVERTING DIRECT CURRENT INTO ALTERNATING CURRENT

CROSS-REFERENCE TO RELATED APPLICATION

This application is related to U.S. patent application Ser. No. 14/163,328, entitled "Three-Phase Inverter with a Repositioned Choke," filed even date herewith, assigned to the same assignee, and incorporated herein by reference in its entirety.

BACKGROUND INFORMATION

1. Field

The present disclosure relates generally to a conversion system and, in particular, to a conversion system for converting direct current into alternating current. Still more particularly, the present disclosure relates to a method and apparatus for reducing the total number of components used in a conversion system to reduce the overall weight, cost, and size of the conversion system.

2. Background

A conversion system, as used herein, is a system of one or more devices used to convert direct current (DC) into alternating current (AC). In certain systems, a centralized conversion system may be used to interface direct current (DC) power sources with various direct current (DC) and alternating current (AC) distribution buses. For example, aircraft power generation and distribution systems may use a centralized conversion system to interface low-voltage direct current power sources with various direct current and alternating current distribution buses. A low-voltage direct current power source may be, for example, a fuel cell, a battery pack, a solar panel, or some other type of power source.

A conversion system may include, for example, a converter for increasing, or stepping-up, the voltage level of a low-voltage direct current power source to form a high-voltage direct current power source. As used herein, a converter is an electrical or electromechanical device used to change the voltage level of the direct current power source.

The high-voltage direct current power source formed by the converter may then be fed to an inverter in the conversion system to form a high-voltage alternating current power source. An inverter, as used herein, is an electrical or electromechanical device used to convert direct current into alternating current. Inverters may take various forms, including, but not limited to, single-phase inverters and three-phase inverters.

Oftentimes, the inverter may cause low-frequency current ripples at the side of the high-voltage direct current power source, which may, in turn, cause the voltage level of the high-voltage direct current power source to fluctuate more than desired. This fluctuation may then, in turn, reduce the quality of the alternating current power source formed by the inverter and may also affect other devices connected to the high-voltage direct current power source. The quality of this alternating current power source may be increased by increasing capacitance within the converter. However, increasing capacitance in the capacitor may reduce overall system performance of the conversion system, increase the weight of the conversion system, increase the size of the conversion system, and increase the cost of the conversion system more than desired. Therefore, it would be desirable to have a method and apparatus that take into account at least some of the issues discussed above, as well as other possible issues.

SUMMARY

In one illustrative embodiment, an apparatus comprises a dual converter and an inverter. The dual converter is configured to change an initial voltage level of an input voltage source to form a plurality of voltage sources. Each of the plurality of voltage sources has voltage levels different from the initial voltage level. The inverter is configured to receive direct current from the plurality of voltage sources formed by the dual converter. The inverter is further configured to convert the direct current into a number of alternating currents.

In another illustrative embodiment, a conversion system comprises a dual converter and an inverter. The dual converter comprises a first converter and a second converter. The first converter is configured to change an initial voltage level of an input voltage source to form a first voltage source having a first voltage level that is different from the initial voltage level. The second converter is configured to change the initial voltage level of the input voltage source to form a second voltage source having a second voltage level that is different from the initial voltage level. The inverter is configured to receive a first direct current from the first voltage source and a second direct current from the second voltage source. The inverter is further configured to convert the first direct current and the second direct current into a number of alternating currents.

In yet another illustrative embodiment, a method for converting direct current into alternating current is provided. An initial voltage level of an input voltage source is changed using a dual converter to form a plurality of voltage sources. Each of the plurality of voltage sources has voltage levels different from the initial voltage level. An inverter is supplied direct current from the plurality of voltage sources formed by the dual converter. The direct current is converted into a number of alternating currents using the inverter.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 3A and 3B are illustrations of a schematic diagram of a power system with a choke repositioned in accordance with an illustrative embodiment;

DETAILED DESCRIPTION

The illustrative embodiments recognize and take into account different considerations. For example, the illustrative embodiments recognize and take into account that it may be desirable to decrease the weight, size, and cost of some currently used conversion systems. The illustrative embodiments recognize and take into account that the capacitance needed within a converter in a conversion system may be reduced by direct current from two regulated high-voltage direct current power sources to the inverter of the conversion system. In particular, it may be desirable to have a converter capable of producing two independent high-voltage direct current power sources using a single low-voltage direct current power source.

Further, the illustrative embodiments also recognize and take into account that inverters typically include an electromagnetic interference (EMI) filter located between the inductors of the inverter and the load of the inverter. This electromagnetic interference filter may reduce undesired high-frequency electromagnetic interference noise by filtering out high-frequency alternating current.

The illustrative embodiments recognize and take into account that repositioning and redesigning the inductors of the electromagnetic interference filter, which are typically collectively referred to as a "choke" or "common mode choke," may reduce the need for an inductor along the neutral line of the inverter. A common mode choke may be used to block common mode current, while allowing differential mode current to pass.

A common mode choke may be made with a specified leakage inductance. For example, without limitation, the inductors of a common mode choke may be redesigned by changing the core size, winding pattern, or some other feature of the inductors to increase the leakage inductance of the inductors. In one illustrative example, the circular angle between adjacent windings in a common mode choke may be selected to achieve a specified leakage inductance. Within the inverter, high leakage inductance may be desired to filter out differential mode current. By relocating the common mode choke and designing for a specified leakage inductance, the inductors that are typically used to provide high leakage inductance may not be needed. Thus, the overall number of inductors needed in the inverter may be reduced, thereby reducing the overall weight, size, and cost of the inverter.

Figure 1:
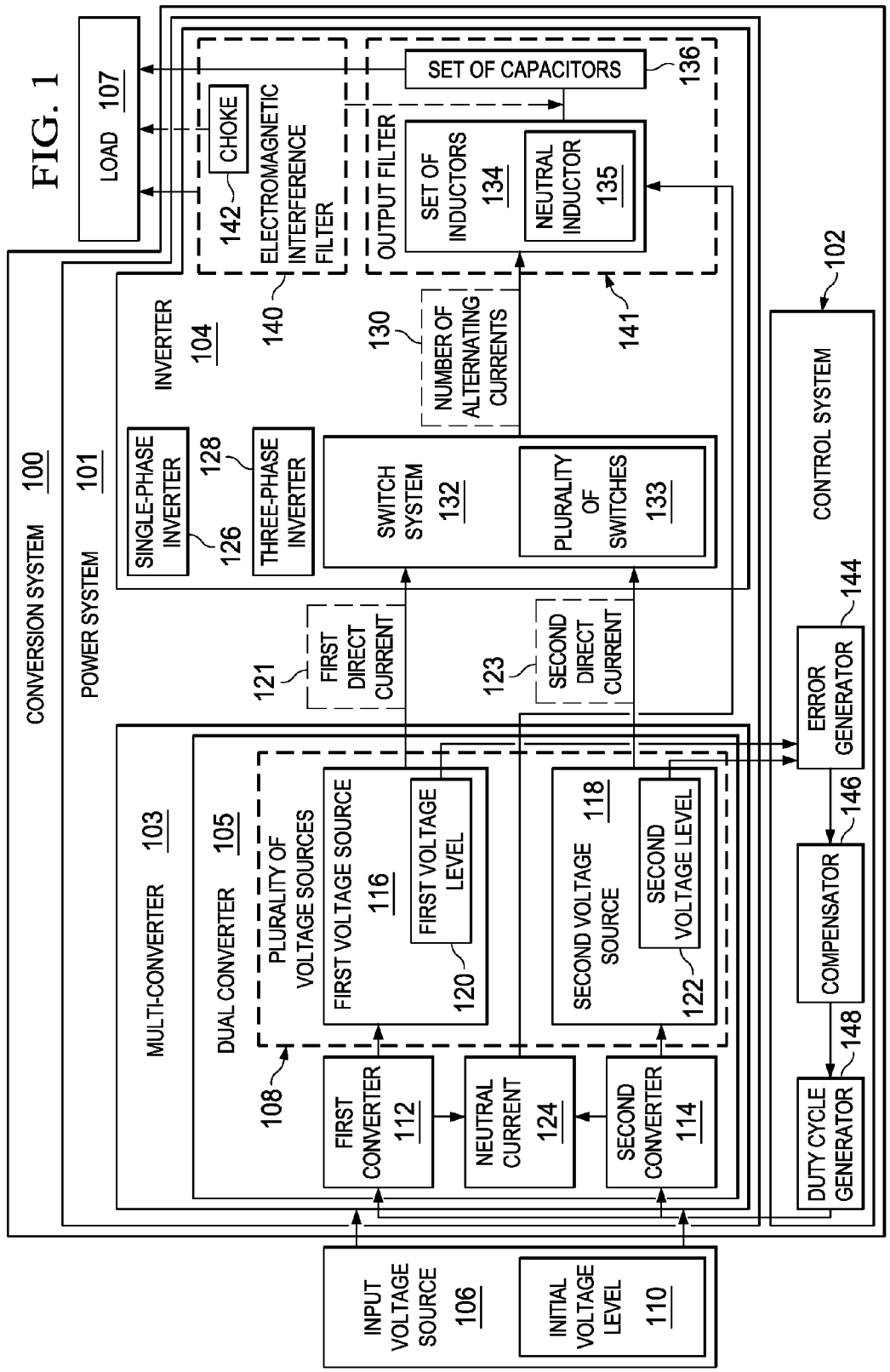
FIG. 1 is an illustration of a conversion system in the form of a block diagram in accordance with an illustrative embodiment.

Referring now to the figures and, in particular, with reference to FIG. 1, an illustration of a conversion system is depicted in the form of a block diagram in accordance with an illustrative embodiment. In FIG. 1, conversion system 100 may include any number of converters and inverters configured to condition input voltage source 106 for load 107. Input voltage source 106 may be a direct current voltage source.

Input voltage source 106 may take the form of, for example, without limitation, a fuel cell, a fuel cell stack, a battery pack, a solar panel, or some other type of source configured to supply direct current. Load 107 may take the form of, for example, without limitation, a resistive load, a galley load, an inductive type of load such as an induction motor, or any other type of device that consumes power.

In this illustrative example, conversion system 100 includes power system 101 and control system 102. Power system 101 includes multi-converter 103 and inverter 104. Multi-converter 103 may be connected to input voltage source 106. Multi-converter 103 is a device configured to form plurality of voltage sources 108 using input voltage source 106. Plurality of voltage sources 108 may be a plurality of direct current voltage sources.

Multi-converter 103 is configured to change initial voltage level 110 of input voltage source 106 to form plurality of voltage sources 108. Each of plurality of voltage sources 108 may have a different voltage level than initial voltage level 110.

For example, multi-converter 103 may increase initial voltage level 110 to form plurality of voltage sources 108 having a higher voltage level. In another example, multi-converter 103 may decrease initial voltage level 110 to form plurality of voltage sources 108 having a lower voltage level.

In this illustrative example, multi-converter 103 takes the form of dual converter 105. Dual converter 105 includes first converter 112 and second converter 114. First converter 112 is configured to change initial voltage level 110 of input voltage source 106 to form first voltage source 116 having first voltage level 120. Second converter 114 is configured to change initial voltage level 110 of input voltage source 106 to form second voltage source 118 having second voltage level 122.

First voltage level 120 and second voltage level 122 may be higher or lower than initial voltage level 110. In this illustrative example, first voltage level 120 and second voltage level 122 may be substantially equal in magnitude but opposite in sign.

First converter 112 and second converter 114 may each be controlled independently. Further, first converter 112 and second converter 114 may be electrically connected. In particular, the negative side of either first converter 112 or second converter 114 may be connected to the positive side of the other converter.

Plurality of voltage sources 108 are used to feed direct current to inverter 104. Inverter 104 is connected to load 107. In other words, dual converter 105 functions as a plurality of input voltage sources for inverter 104. For example, first voltage source 116 may provide first direct current 121 to inverter 104, while second voltage source 118 may provide second direct current 123 to inverter 104. Neutral current 124 may also be supplied to inverter 104. Neutral current 124 may be the current drawn from substantially the midpoint between first voltage source 116 and second voltage source 118.

Inverter 104 may take the form of single-phase inverter 126 or three-phase inverter 128, depending on the implementation. Of course, inverter 104 may take some other form in some other illustrative example.

Inverter 104 is configured to convert the direct current provided by plurality of voltage sources 108 into number of alternating currents 130. For example, when inverter 104 takes the form of single-phase inverter 126, first direct current 121 and second direct current 123 may be converted into a single alternating current such that inverter 104 may function as a single-phase alternating current source. When inverter 104 takes the form of three-phase inverter 128, first direct current 121 and second direct current 123 may be converted into three alternating currents such that inverter 104 may function as a three-phase alternating current source.

As depicted, inverter 104 may include switch system 132, set of inductors 134, set of capacitors 136, and electromagnetic interference filter (EMI) 140. As used herein, a "set of" items may include one or more items. Thus, set of inductors 134 may include one or more inductors and set of capacitors 136 may include one or more capacitors, depending on the implementation.

Switch system 132 may include different numbers of switches, depending on the type of inverter 104. Each of these switches may be implemented using, for example, without limitation, a bipolar transistor device, a metal-oxide semiconductor field-effect transistor (MOSFET) device, an insulated-gate bipolar transistor device, or some other type of semiconductor device or switching device.

Switch system 132 is configured to convert first direct current 121 and second direct current 123 into number of alternating currents 130. Switch system 132 may include plurality of switches 133. The number of switches in plurality of switches 133 may depend on the type of inverter 104.

Set of inductors 134 and set of capacitors 136 may together form output filter 141 for number of alternating currents 130. Output filter 141 may be used to filter out high-frequency switching components of number of alternating currents 130. Set of inductors 134 and set of capacitors 136 may include an inductor and a capacitor, respectively, for filtering each of number of alternating currents 130. Responsive to number of alternating currents 130 being formed, a number of alternating voltages are formed across set of capacitors 136.

Further, in some cases, set of inductors 134 may also include neutral inductor 135 electrically connected to a neutral point in inverter 104. Neutral inductor 135 may be configured for use in filtering neutral current 124.

In this illustrative example, electromagnetic interference filter 140 may be located between output filter 141 and load 107. Electromagnetic interference filter 140 may include any number of capacitors and inductors. The inductors of electromagnetic interference filter 140 may form choke 142. Choke 142 may be a common mode choke in this illustrative example. Choke 142 may be comprised of at least one magnetically coupled inductor having a leakage inductance designed to allow a size of set of inductors 134 in inverter 104 to be reduced. Choke 142 may be designed specifically for filtering common mode higher-frequency electromagnetic interference noise in a circuit.

In this illustrative example, supplying direct current to inverter 104 using first voltage source 116 and second voltage source 118, which are independently regulated, may reduce the number of switches needed for plurality of switches 133 when inverter 104 takes the form of three-phase inverter 128. In particular, the number of legs needed for each of the switches in switch system 132 may be reduced such that the overall number of switches needed may be reduced.

For example, each switch in plurality of switches 133 may be implemented using three half-bridge switch legs instead of four half-bridge switch legs. This reduction may allow only six switches to be needed when inverter 104 takes the form of three-phase inverter 128.

In this illustrative example, when inverter 104 is connected to load 107 as depicted, low-frequency current ripples may occur at the direct current side of inverter 104 in first direct current 121 and second direct current 123. These low-frequency current ripples may cause undesired low-frequency fluctuations of first voltage level 120 and second voltage level 122 within multi-converter 103. The fluctuations in first voltage level 120 and second voltage level 122 may be referred to as voltage ripples.

Control system 102 provides feedback control for power system 101. In particular, control system 102 provides feedback control for first voltage level 120 and second voltage level 122. More specifically, control system 102 may be used to reduce the undesired effects of the low-frequency voltage ripples of first voltage level 120 and second voltage level 122 using less capacitance than is currently required.

The undesired effects of the voltage ripples may include a reduction in the quality of the number of alternating voltages formed across set of capacitors 136. In particular, the voltage magnitude, phase balance, and total harmonic distortion of the number of alternating voltages across set of capacitors 136 may not be as accurate as desired when there are voltage ripples. Further, voltage ripples may lead to the presence of undesired harmonics other than the fundamental frequency in the number of alternating voltages.

As depicted, control system 102 may include error generator 144, compensator 146, and duty cycle generator 148. Error generator 144 may generate the common mode error, which is the difference between common mode voltage of plurality of voltage sources 108 and a reference common mode voltage. Further, error generator 144 may also generate the differential mode error, which is the difference between the differential mode voltage of plurality of voltage sources 108 and a reference differential mode voltage level.

Compensator 146 is configured to function as both a direct current quantity controller and a plug-in resonant controller. In particular, compensator 146 may function as a direct current quantity controller by controlling the direct current quantity of the common mode voltage and the differential mode voltage. Further, compensator 146 may function as a resonant controller by rejecting undesired frequency disturbances or noise. Compensator 146 receives the common mode error and differential mode error as inputs and outputs a common mode duty cycle and a differential mode duty cycle, respectively, based on the control of the direct current quantity and the rejection of the undesired frequency disturbances.

Duty cycle generator 148 uses both the common mode duty cycle and the differential mode duty cycle formed by compensator 146 to generate a first duty cycle for first converter 112 and a second duty cycle for second converter 114. In this manner, control system 102 uses feedback control to control first converter 112 to reduce fluctuations in first voltage level 120 and to control second converter 114 to reduce fluctuations in second voltage level 122.

In one illustrative example, choke 142 may be located between set of capacitors 136 and load 107. However, in some illustrative examples, choke 142 may be positioned between set of inductors 134 and set of capacitors 136 as part of output filter 141 and redesigned for a specified leakage inductance that will filter out differential mode current. In particular, choke 142 may be redesigned to provide higher than normal leakage inductance by changing the magnetic core size, winding pattern, or some other feature in choke 142.

Repositioning and redesigning choke 142 in this manner may allow the number of inductors included in set of inductors 134 to be reduced. For example, when choke 142 has been repositioned and redesigned, set of inductors 134 may include three inductors rather than four inductors. In particular, when choke 142 is positioned within output filter 141 and redesigned for a higher leakage inductance to filter out differential mode current, neutral inductor 135 may not be needed when a neutral point of load 107 is required to be connected to switch system 132 of inverter 104.

Thus, the inductance needed by the other inductors in set of inductors 134 may be reduced. In this manner, repositioning choke 142 within output filter 141 and redesigning choke 142 may reduce the overall number of inductors needed in inverter 104 and thereby the overall weight, size, and cost of inverter 104. Further, repositioning the choke does not change the overall performance of electromagnetic interference filter 140 beyond selected tolerances.

The illustration of conversion system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, although conversion system 100 only includes one dual converter 105 and one inverter 104 in FIG. 1, conversion system 100 may be implemented using more than one dual converter and more than one inverter. In one illustrative example, multiple switch systems may be interleaved to form inverter 104.

Further, similar to choke 142, the choke of any three-phase inverter that typically has a neutral inductor such as neutral inductor 135 may be repositioned within the output filter of the inverter to remove the need for a neutral inductor. Thus, this type of implementation for inverter 104 may be used in various conversion systems, including ones that do not include dual converter 105.

With reference now to FIG. 2, an illustration of a schematic diagram for a power system in a conversion system is depicted in accordance with an illustrative embodiment. In this illustrative example, conversion system 200 may be an example of one implementation for conversion system 100 in FIG. 1.

Power system 201 in conversion system 200 may be an example of one implementation for power system 101 in FIG. 1. As depicted, power system 201 is a power circuit that includes dual converter 202 and inverter 204. Dual converter 202 and inverter 204 are examples of circuit implementations for dual converter 105 and inverter 104, shown in block form, respectively, in FIG. 1.

Dual converter 202 is configured to change an initial voltage level of input voltage source 206 to form first voltage source 208 and second voltage source 210 having different voltage levels from the initial voltage level of input voltage source 206. Input voltage source 206, first voltage source 208, and second voltage source 210 may be examples of implementations for input voltage source 106, first voltage source 116, and second voltage source 118, respectively, in FIG. 1.

As depicted, dual converter 202 includes first converter 212 and second converter 214. First converter 212 and second converter 214 may be examples of implementations for first converter 112 and second converter 114, respectively, in FIG. 1. First converter 212 includes full-bridge switch cell (FBSC) 216 and transformer rectifier cell (TRC) 218. Second converter 214 includes full-bridge switch cell (FBSC) 220 and transformer rectifier cell (TRC) 222. Transformer rectifier cell (TRC) 218 and transformer rectifier cell (TRC) 222 electrically connect full-bridge switch cell (FBSC) 216 and full-bridge switch cell (FBSC) 220.

First voltage source 208 supplies first direct current 224 to inverter 204, while second voltage source 210 supplies second direct current 225 to inverter 204. In this illustrative example, inverter 204 is a three-phase inverter. Thus, inverter 204 may be an example of one implementation for three-phase inverter 128 in FIG. 1.

As depicted, inverter 204 includes switch system 226, set of inductors 228, set of capacitors 230, and electromagnetic interference filter 232, which may be examples of implementations for switch system 132, set of inductors 134, set of capacitors 136, electromagnetic interference filter 140, and load 107, respectively, in FIG. 1. Inverter 204 may be electrically connected to load 234, which may be an example of one implementation for load 107 in FIG. 1. As depicted, midpoint 231 between first voltage source 208 and second voltage source 210 is electrically connected to neutral point 236 of load 234 through inductor 256, which may be the neutral point of inverter 204. Neutral current 235 may flow between midpoint 231 and neutral point 236.

In this illustrative example, electromagnetic interference filter 232 may include choke 233, which may be an example of one implementation for choke 142 in FIG. 1. Electromagnetic interference filter 232 may also include other components, such as capacitors, not shown in this example.

Switch system 226 includes six semiconductor switches that form first phase group 238, second phase group 240, and third phase group 242. Although six semiconductor switches are shown in FIG. 2, a switch system may include some other number of semiconductor switches in other illustrative examples. For example, without limitation, the switch system in an interleaving structured inverter may include twelve, eighteen, or some other number of semiconductor switches. Switch system 226 is configured to convert first direct current 224 and second direct current 225 into alternating currents 244, 246, and 248.

Set of inductors 228 includes inductors 250, 252, 254, and 256. Inductor 256 is an example of one implementation for neutral inductor 135 in FIG. 1. Together, set of capacitors 230 and set of inductors 228 may form output filter 255. Output filter 255 may be an example of one implementation for output filter 141 in FIG. 1. As depicted, choke 233 is located outside of output filter 255 in this illustrative example.

Figure 2A:
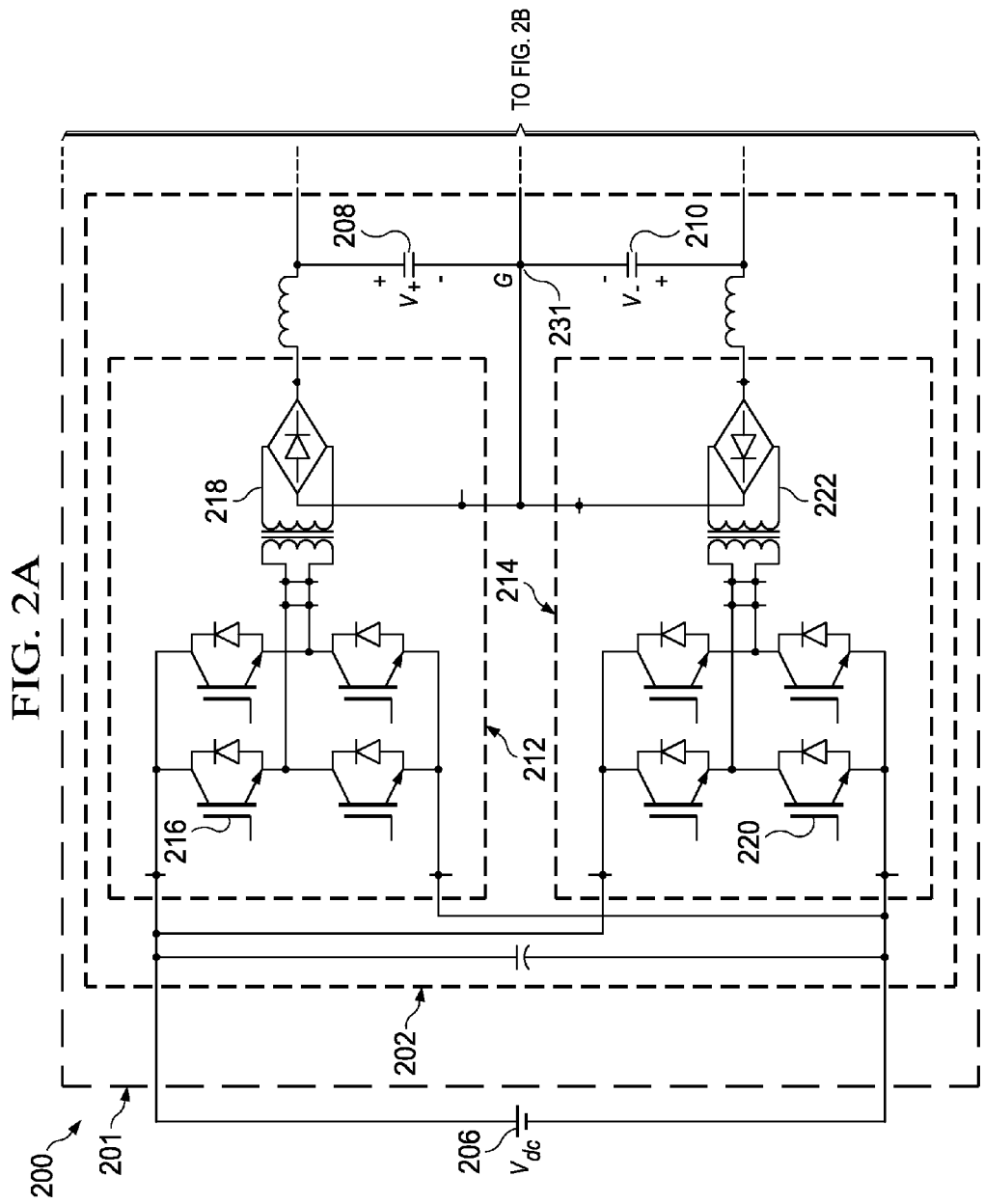
FIGS. 2A and 2B are illustrations of a schematic diagram for a power system in a conversion system in accordance with an illustrative embodiment.
Figure 2B:
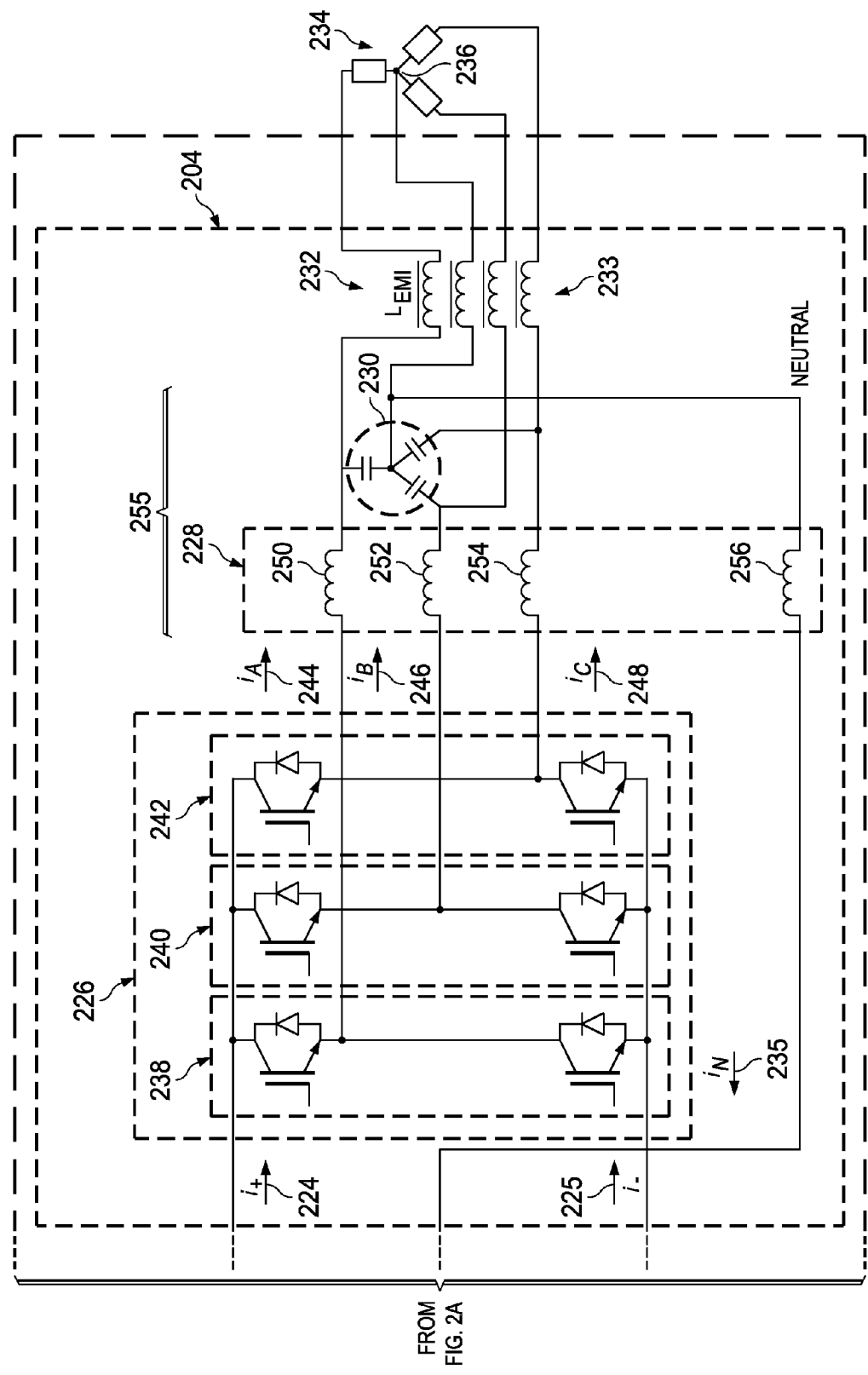
Figure 3A:
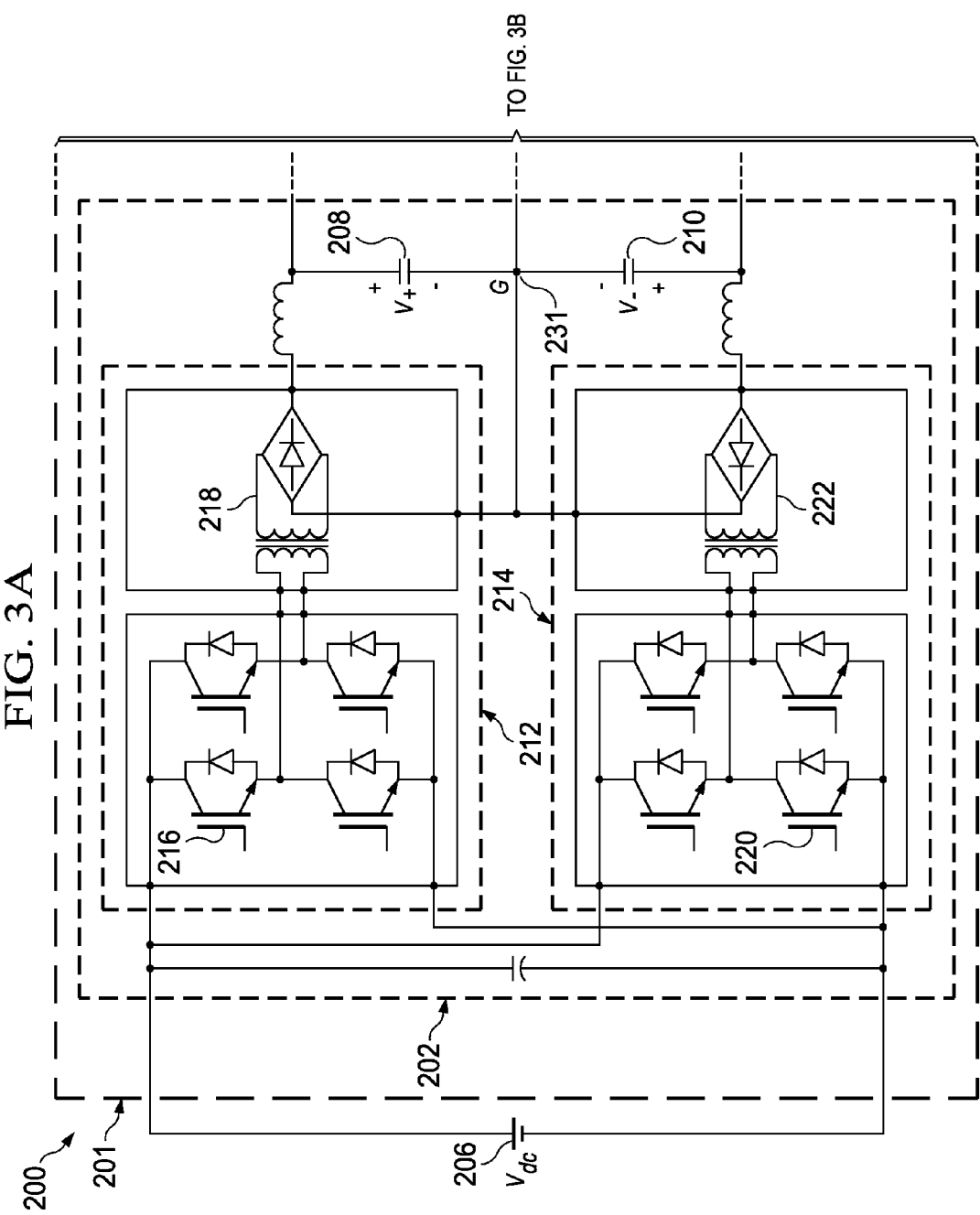

With reference now to FIGS. 3A and 3B, an illustration of a schematic diagram of power system 201 from FIGS. 2A and 2B with choke 233 repositioned is depicted in accordance with an illustrative embodiment. In this illustrative example, choke 233 from FIG. 2B has been repositioned within output filter 255, between set of inductors 228 and set of capacitors 230. Further, choke 233 has been redesigned to have a higher leakage inductance than choke 233 in FIG. 2B. In particular, choke 233 has been redesigned to have a leakage inductance sufficiently high to filter out differential mode current.

By repositioning and redesigning choke 233 in this manner, inductor 256 in FIG. 2B for neutral current 235 may be removed from power system 201 and the size of and inductance provided by inductors 250, 252, and 254 may be reduced. In particular, when choke 233 has a higher leakage inductance, the inductance needed by inductors 250, 252, and 254 may be reduced. In this manner, repositioning and redesigning choke 233 reduces the number and size of inductors needed in inverter 204, thereby reducing the overall weight, size, and cost of inverter 204 and power system 201.

Figure 4:
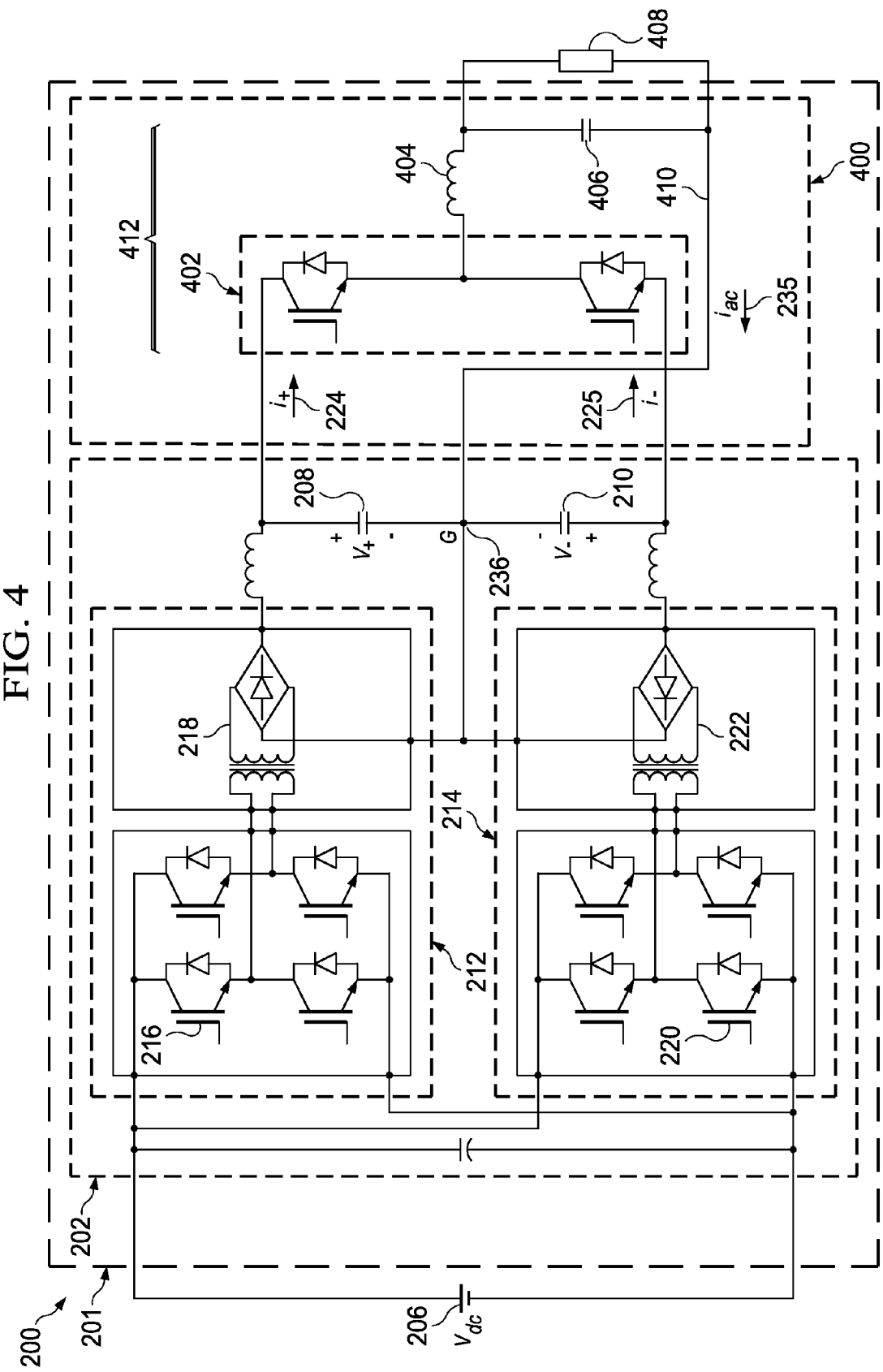
FIG. 4 is an illustration of a schematic diagram of a power system having a single-phase inverter in accordance with an illustrative embodiment.

With reference now to FIG. 4, an illustration of a schematic diagram of power system 201 from FIGS. 2A and 2B having a single-phase inverter is depicted in accordance with an illustrative embodiment. In this illustrative example, inverter 204 in FIG. 2B has been replaced with inverter 400, another example of one implementation for inverter 104 in FIG. 1. Inverter 400 is a single-phase inverter. Thus, inverter 400 may be an example of one implementation for single-phase inverter 126 in FIG. 1.

As depicted, inverter 400 includes switch system 402, inductor 404, capacitor 406, and load 408, which may be examples of implementations for switch system 132, set of inductors 134, set of capacitors 136, and load 107, respectively, in FIG. 1. Switch system 402 has two switches that are configured to convert first direct current 224 and second direct current 225 into alternating current 410. Alternating current 410 may be an example of one implementation for number of alternating currents 130 in FIG. 1.

Inductor 404 and capacitor 406 form output filter 412, which may be an example of one implementation for output filter 141 in FIG. 1. Output filter 412 is configured to filter the voltage over capacitor 406.

Figure 5:
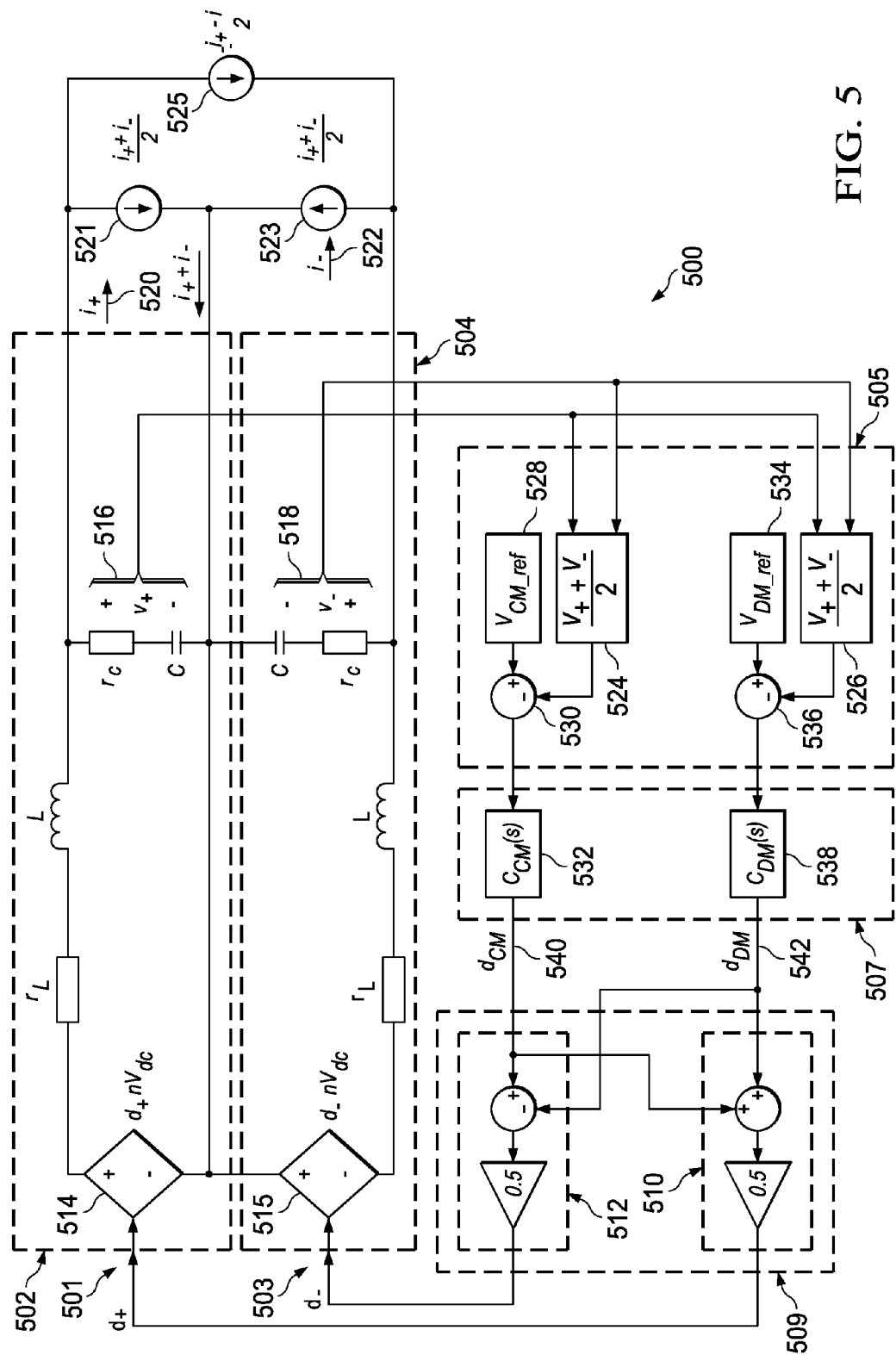
FIG. 5 is an illustration of a control diagram for a conversion system in accordance with an illustrative embodiment.

With reference now to FIG. 5, an illustration of a control system for a conversion system is depicted in accordance with an illustrative embodiment. In this illustrative example, control system 500 may be an example of one implementation for control system 102 in FIG. 1. Control system 500 may be used to control the voltage level of a plurality of voltage sources formed by a dual converter in a power system of a conversion system, such as dual converter 202 in power system 201 of conversion system 200 in FIG. 2.

In this illustrative example, control system 500 is shown in association with first model 502 and second model 504. First model 502 and second model 504 may be models of first converter 212 and second converter 214 in FIG. 2, respectively. In particular, first model 502 represents the circuit equivalent of first converter 212, while second model 504 represents the circuit equivalent of second converter 214.

Further, as depicted, control system 500 includes error generator 505, compensator 507, and duty cycle generator 509, which may be examples of implementations for error generator 144, compensator 146, and duty cycle generator 148, respectively, in FIG. 1.

In this illustrative example, input 514 represents the controllable voltage source formed by input voltage source 206 and the transformer turn ratio and first duty cycle of first converter 212 in FIG. 2. Input 515 represents the controllable voltage source formed by input voltage source 206 and the transformer turn ratio and duty cycle of second converter 214 in FIG. 2. Control system 500 may be used to control duty cycle 501 of first converter 212 to control input 514 and duty cycle 503 of second converter 214 to control input 515.

First voltage 516 and second voltage 518 represent first voltage source 208 and second voltage source 210, respectively, in FIG. 2. Further, positive current 520 represents first direct current 224 and negative current 522 represents second direct current 225 in FIG. 2. Current sources 521, 523, and 525 model the behavior of the direct current side of inverter 204 in FIG. 2.

In control system 500:
$d_+$ is duty cycle 501 for first converter 212;
$d_-$ is duty cycle 503 for second converter 214;
n is the transformer ratio of transformer rectifier cell (TRC) 218 to transformer rectifier cell (TRC) 222;
$V_{dc}$ is the voltage level of input voltage source 206 in FIG. 2;
$r_L$ is the serial equivalent resistance of inductor L;
$r_C$ is the serial equivalent resistance of capacitor C;
$v_+$ is the voltage of first voltage source 208;
$v_-$ is the voltage of second voltage source 210;
$i_+$ is first direct current 224; and
$i_-$ is second direct current 225.

The levels of $v_+$ and $v_-$ may be controlled by duty $d_+$ and $d_-$, respectively, and the transformer ratio. The transformer ratio is fixed but the duty cycles may be controlled by control system 500 to change the levels of $v_+$ and $v_-$.

The common mode quantity of positive current 520 and negative current 522 is $$\frac{i_+ + i_-}{2}.$$

This common mode quantity includes only the fundamental frequency component. In other words, $$\frac{i_+ + i_-}{2}$$

exists only at the fundamental frequency, $\omega_f$, of inverter 204. The differential mode quantity of positive current 520 and negative current 522 is $$\frac{i_+ + i_-}{2}$$

and contains only direct current and second order harmonic components. In other words, $$\frac{i_+ + i_-}{2}$$

only exists at the direct current quantity and at the double of the fundamental frequency, $2\omega_f$.

Each of $v_+$ and $v_-$ may be derived in the frequency domain as follows:

$$v_0 = \frac{dnV_{dc}(sCr_C + 1)}{CLs^2 + sC(r_L + r_C) + 1} - \frac{i_{load}(sL + r_L)(sCr_C + 1)}{CLs^2 + sC(r_L + r_C) + 1}, \quad (1)$$

where $v_0$ represents either $v_+$ or $v_-$; d represents either $d_+$ or $d_-$; and $i_{load}$ represents either $i_+$ or $i_-$. Equation 1 can then be represented as follows:

$$P(s) = \frac{nV_{dc}(sCr_C + 1)}{CLs^2 + sC(r_L + r_C) + 1}, \text{ and} \quad (2)$$

$$Z(s) = \frac{(sL + r_L)(sCr_C + 1)}{CLs^2 + sC(r_L + r_C) + 1}, \text{ such that} \quad (3)$$

$$v_0 = dP(s) - i_{load}Z(s). \quad (4)$$

where P(s) is a control plant for first converter 212 and second converter 214; $i_{load}$ for first converter 212 is the load current, $i_+$, drawing from first voltage source 208; $i_{load}$ for second converter 504 is the load current, $i_-$, drawing from second voltage source 210; Z(s) is the converter open loop output impedance before feedback control has been implemented for first converter 212 and second converter 214; and $i_{load}Z(s)$ represents the low-frequency disturbance in first voltage 516 and second voltage 518 caused by the low-frequency ripples in $i_{load}$, which may be referred to as the frequency component of $i_{load}$. Further, $$v_+ = d_+P(s) - i_+Z(s), \text{ and} \quad (5)$$

$$v_- = d_-P(s) - i_-Z(s). \quad (6)$$

The common mode duty cycle, $d_{CM}$, may then be $$d_{CM} = \frac{d_+ + d_-}{2}$$

and the differential mode duty cycle, $d_{DM}$, may then be $$d_{DM} = \frac{d_+ + d_-}{2}.$$

Equation (5) and equation (6) may superposed as follows:

$$\frac{v_+ + v_-}{2} = d_{CM} P(s) - \frac{i_+ + i_-}{2} Z(s), \text{ and} \quad (7)$$

$$\frac{v_+ - v_-}{2} = d_{DM} P(s) - \frac{i_+ - i_-}{2} Z(s), \text{ respectively,} \quad (8)$$

where $$\frac{v_+ + v_-}{2}$$

is the common mode voltage and $$\frac{v_+ - v_-}{2}$$

is the differential mode voltage.

A common mode compensator, $C_{CM}(s)$, and a differential mode compensator, $C_{DM}(s)$, may then be used to generate the common mode duty cycle, $d_{CM}$, and the differential mode duty cycle, $d_{DM}$. These duty cycles may then be used to generate the duty cycles for first converter 212 based on feedback control.

When input voltage source 206 is current-ripple insensitive, the control of $d_+$ may be optimized to ensure that $v_+$ does not fluctuate outside of selected tolerances and the control of $d_-$ may be optimized to ensure that $v_-$ does not fluctuate outside of selected tolerances. When input voltage source 206 is current-ripple sensitive, the control of $d_+$ may be optimized with reduced capacitance to ensure that low-frequency current ripples are minimized to within selected tolerances.

The common mode compensator, $C_{CM}(s)$, may be preferred for use in reducing or rejecting any disturbances introduced by the fundamental frequency component in the common mode current quantity $$\frac{i_+ + i_-}{2}.$$

The differential mode compensator, $C_{DM}(s)$, may be preferred for use in reducing or rejecting any disturbances introduced by the double of the fundamental frequency component in the differential mode current quantity $$\frac{i_+ - i_-}{2}.$$

Given a control plant, P(s), a plug-in resonant controller may be used to reject undesired frequency disturbances. A general frequency domain representation of the plug-in resonant controller is given as follows:

$$C_{res}(s) = \frac{2\omega_c s}{P(s)(s^2 + \omega^2)}. \quad (9)$$

where $C_{res}(s)$ is the plug-in resonant controller. Further, a direct current quantity controller may be used to control the direct current quantity of the common mode voltage, $$\frac{v_+ + v_-}{2},$$

and the differential mode voltage, $$\frac{v_+ - v_-}{2}.$$

A general frequency domain representation of the direct current quantity controller may be given as follows:

$$C_{dc}(s) = \frac{K_p}{s(s + \omega_{p1})(s + \omega_{p2})} \quad (10)$$

where $C_{dc}(s)$ is the direct current quantity controller. The frequency domain Laplace representation of the two compensators may be given as follows:

$$C_{CM}(s) = \quad (11)$$
$$C_{dc}(s) + C_{CM_{res}}(s) = \frac{K_p}{s(s + \omega_{p1})(s + \omega_{p2})} + \frac{2\omega_{CM} s}{P(s)(s^2 + \omega_f^2)} \text{ and}$$

$$C_{DM}(s) = C_{dc}(s) + C_{DM_{res}}(s) = \frac{K_p}{s(s + \omega_{p1})(s + \omega_{p2})} + \frac{2\omega_{DM} s}{P(s)(s^2 + \omega_f^2)}. \quad (12)$$

where $C_{CM}(s)$ is the common mode compensator and $C_{DM}(s)$ is the differential mode compensator. Each of the common mode compensator and the differential mode compensator combines a plug-in resonant controller with a direct current quantity controller.

As depicted in control system 500, error generator 505 may sample and use first voltage 516 and second voltage 518 to form common mode voltage 524 and differential mode voltage 526. Subtractor 530 in error generator 505 may find the difference between common mode reference voltage 528, $V_{CM(ref)}$, and common mode voltage 524. This difference may be referred to as the common mode error and may be sent as input into common mode compensator 532. Subtractor 536 may find the difference between differential mode reference voltage 534, $V_{DM(ref)}$, and differential mode voltage 526. This difference may be referred to as the differential mode error and may be sent as input into differential mode compensator 538.

Common mode compensator 532, $C_{CM}(s)$, outputs common mode duty cycle 540. Differential mode compensator 538, $C_{DM}(s)$, outputs differential mode duty cycle 542.

Duty cycle generator 509 receives common mode duty cycle 540 and differential mode duty cycle 542. As depicted, duty cycle generator 509 includes positive duty cycle generator 510 and negative duty cycle generator 512.

Positive duty cycle generator 510 uses common mode duty cycle 540 and differential mode duty cycle 542 to generate a positive duty cycle, $d_+$, which is then used to control the duty cycle at input 514. Negative duty cycle generator 512 uses common mode duty cycle 540 and differential mode duty cycle 542 to generate a negative duty cycle, $d_-$, which is then used to control the duty cycle at input 515. These operations are represented by the following equations:

$$d_+ = \frac{d_{CM} + d_{DM}}{2}, \text{ and} \tag{13}$$

$$d_- = \frac{d_{CM} - d_{DM}}{2}. \tag{14}$$

By generating the duty cycles, $d_+$ and $d_-$, based on feedback control, control system 500 may reduce direct current side voltage ripples caused by inverter input direct current ripples. Thus, control system 500 allows improved direct current voltage quality without requiring increases in capacitance within dual converter 202 beyond selected tolerances.

The illustrations of power system 201 of conversion system 200 in FIGS. 2-4 and control system 500 of conversion system 200 in FIG. 5 are not meant to imply physical or architectural limitations to the manner in which an illustrative embodiment may be implemented. Other components in addition to or in place of the ones illustrated may be used. Some components may be optional.

The different components shown in FIGS. 2-5 may be illustrative examples of how components shown in block form in FIG. 1 can be implemented as circuit components. Additionally, some of the components in FIGS. 2-5 may be combined with components in FIG. 1, used with components in FIG. 1, or a combination of the two.

Figure 6:
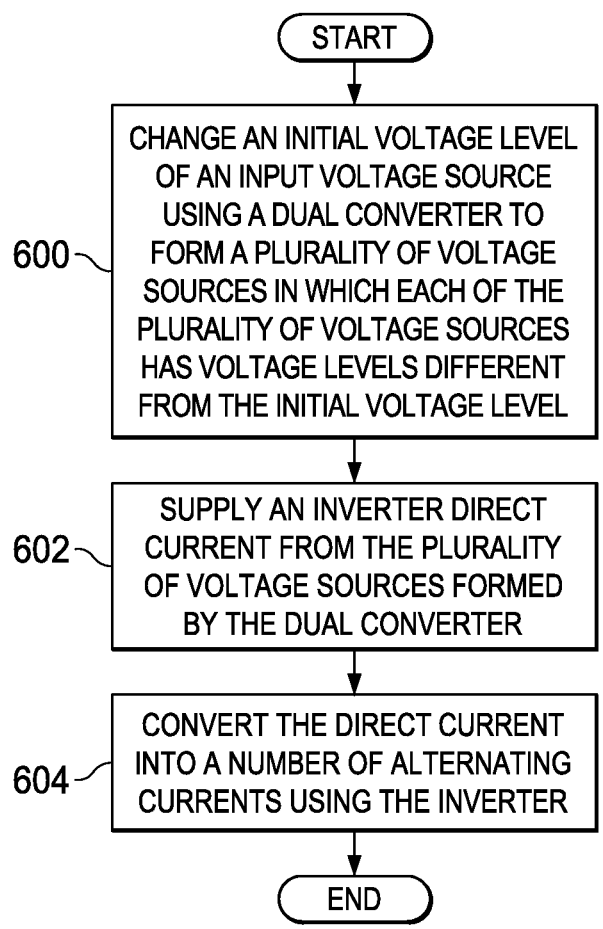
FIG. 6 is an illustration of a process for converting direct current into alternating current in the form of a flowchart in accordance with an illustrative embodiment.

With reference now to FIG. 6, an illustration of a process for converting direct current into alternating current is depicted in the form of a flowchart in accordance with an illustrative embodiment. The process illustrated in FIG. 6 may be implemented using conversion system 100 in FIG. 1.

The process begins by changing an initial voltage level of an input voltage source using a dual converter to form a plurality of voltage sources in which each of the plurality of voltage sources has voltage levels different from the initial voltage level (operation 600). Next, an inverter is supplied direct current from the plurality of voltage sources formed by the dual converter (operation 602).

The direct current is converted into a number of alternating currents using the inverter (operation 604), with the process terminating thereafter. The inverter may take the form of a single-phase inverter or a three-phase inverter, depending on the implementation.

Figure 7:
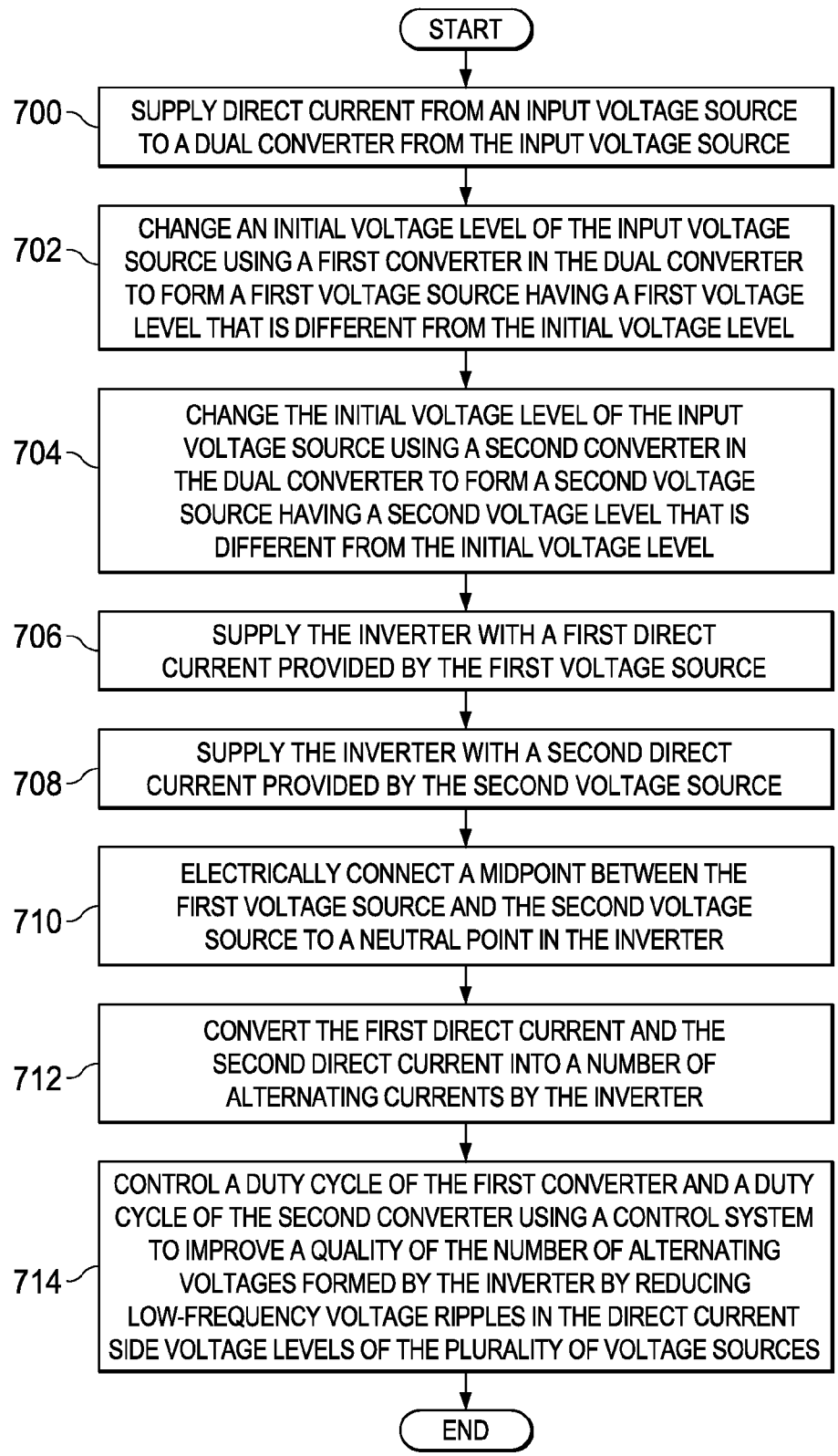
FIG. 7 is an illustration of a process for converting direct current into alternating current in the form of a flowchart in accordance with an illustrative embodiment.

With reference now to FIG. 7, an illustration of a process for converting direct current into alternating current is depicted in the form of a flowchart in accordance with an illustrative embodiment. The process illustrated in FIG. 7 may be implemented using conversion system 100 in FIG. 1.

The process begins by supplying direct current from an input voltage source to a dual converter from the input voltage source (operation 700). The input voltage source may take the form of, for example, without limitation, a fuel cell, a battery pack, a solar panel, or some other type of voltage source configured to supply direct current.

Next, an initial voltage level of the input voltage source is changed using a first converter in the dual converter to form a first voltage source having a first voltage level that is different from the initial voltage level (operation 702). Further, the initial voltage level of the input voltage source is changed using a second converter in the dual converter to form a second voltage source having a second voltage level that is different from the initial voltage level (operation 704).

The inverter is supplied with a first direct current provided by the first voltage source (operation 706). The inverter is supplied with a second direct current provided by the second voltage source (operation 708). Further, a midpoint between the first voltage source and the second voltage source is electrically connected to a neutral point in the inverter (operation 710).

Thereafter, the first direct current and the second direct current are converted into a number of alternating currents by the inverter (operation 712). In this manner, the inverter uses the first voltage source and the second voltage source to form a number of alternating current sources.

Further, a duty cycle of the first converter and a duty cycle of the second converter are controlled using a control system to improve a quality of the number of alternating voltages formed by the inverter by reducing low-frequency voltage ripples in the direct current side voltage levels of the plurality of voltage sources (operation 714), with the process terminating thereafter. Operation 714 may be performed based on feedback control.

Figure 8:
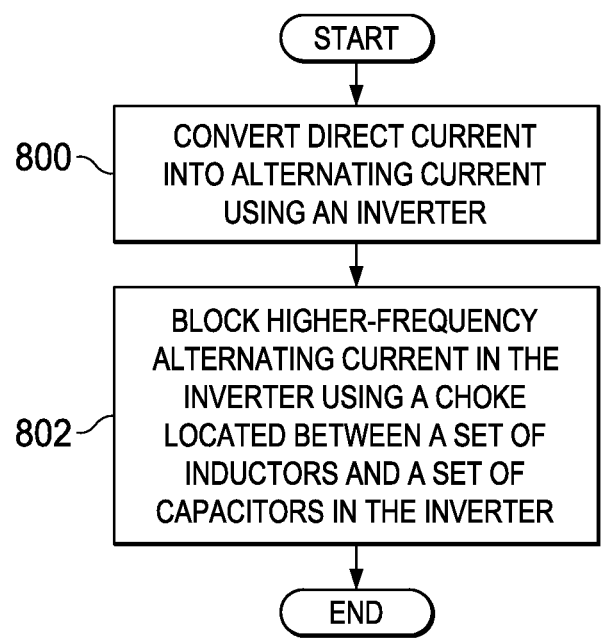
FIG. 8 is an illustration of a process for converting direct current into alternating current in the form of a flowchart in accordance with an illustrative embodiment.

With reference now to FIG. 8, an illustration of a process for converting direct current into alternating current is depicted in the form of a flowchart in accordance with an illustrative embodiment. The process illustrated in FIG. 8 may be implemented using conversion system 100 in FIG. 1.

The process begins by converting direct current into alternating current using an inverter (operation 800). Next, higher-frequency alternating current is blocked in the inverter using a choke located between a set of inductors and a set of capacitors in the inverter (operation 802), with the process terminating thereafter. In operation 802, other components within the inverter may also be used to block high-frequency noise. In particular, the inverter may include a set of inductors and capacitors that are used along with the choke to block high-frequency noise.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a dual converter configured to change an initial voltage level of an input voltage source to form a plurality of voltage sources in which each of the plurality of voltage sources has voltage levels different from the initial voltage level, wherein the dual converter comprises:
a first converter connected to the input voltage source and configured to change the initial voltage level of the input voltage source to form a first voltage source having a first voltage level that is different from the initial voltage level; and
a second converter connected to the input voltage source in parallel with the first converter and configured to change the initial voltage level of the input voltage source to form a second voltage source having a second voltage level that is different from the initial voltage level;
wherein the first voltage source and the second voltage source share a common ground; and
wherein the first voltage level and the second voltage level are substantially equal in magnitude and opposite in sign with respect to the common ground; and
an inverter configured to receive direct current from the plurality of voltage sources formed by the dual converter and convert the direct current into a number of alternating currents.

2. The apparatus of claim 1, wherein the inverter comprises:
a switch system comprising a plurality of switches, wherein a switch in the plurality of switches is a semiconductor device.

3. The apparatus of claim 2, wherein the inverter is a three-phase inverter and the plurality of switches includes six switches.

4. The apparatus of claim 1, wherein the inverter is supplied the direct current by the first voltage source and the second voltage source, and wherein the first voltage source and the second voltage source are electrically connected to a neutral point of the inverter between the first voltage source and the second voltage source.

5. The apparatus of claim 1 further comprising:
a control system configured to generate a duty cycle for the first converter and a duty cycle for the second converter based on feedback control to improve a quality of the number of alternating voltages formed by the inverter.

6. The apparatus of claim 5, wherein the duty cycle generated for the first converter and the duty cycle generated for the second converter based on the feedback control are configured to reduce low-frequency voltage ripples in the voltage levels of the plurality of voltage sources.

7. The apparatus of claim 5, wherein the control system comprises:
an error generator configured to generate a common mode error and a differential mode error based on the voltage levels of the plurality of voltage sources;
a compensator configured to generate a common mode duty cycle based on the common mode error and a differential mode duty cycle based on the differential mode error; and
a duty cycle generator configured to generate a positive duty cycle for the first converter based on the common mode duty cycle and the differential mode duty cycle and a negative duty cycle for the second converter based on the common mode duty cycle and the differential mode duty cycle in which the positive duty cycle and the negative duty cycle are controlled to reduce low-frequency voltage ripples in the voltage levels of the plurality of voltage sources.

8. The apparatus of claim 1, wherein the inverter comprises:
a set of inductors; and
a set of capacitors.

9. The apparatus of claim 8, wherein the set of inductors includes a neutral inductor and the inverter further comprises:
an electromagnetic interference filter that includes a choke located between the set of capacitors and a load.

10. The apparatus of claim 8, wherein the inverter further comprises:
an electromagnetic interference filter that includes a choke located between the set of inductors and the set of capacitors.

11. A conversion system comprising:
a dual converter comprising:
a first converter connected to a first input voltage source configured to change an initial voltage level of the input voltage source to form a first voltage source having a first voltage level that is different from the initial voltage level; and
a second converter connected to the input voltage source in parallel with the first converter and configured to change the initial voltage level of the input voltage source to form a second voltage source having a second voltage level that is different from the initial voltage level;
wherein the first voltage source and the second voltage source share a common ground; and
wherein the first voltage level and the second voltage level are substantially equal in magnitude and opposite in sign; and
an inverter configured to receive a first direct current from the first voltage source and a second direct current from the second voltage source and convert the first direct current and the second direct current into a number of alternating currents.

12. A method for converting direct current into alternating current, the method comprising:
changing an initial voltage level of an input voltage source using a dual converter to form a plurality of voltage sources in which each of the plurality of voltage sources has voltage levels different from the initial voltage level, wherein the dual converter comprises:
a first converter connected to the input voltage source and configured to change the initial voltage level of the input voltage source to form a first voltage source having a first voltage level that is different from the initial voltage level; and
a second converter connected to the input voltage source in parallel with the first converter and configured to change the initial voltage level of the input voltage source to form a second voltage source having a second voltage level that is different from the initial voltage level;

wherein the first voltage source and the second voltage source share a common ground; and
wherein the first voltage level and the second voltage level are substantially equal in magnitude and opposite in sign;
supplying an inverter the direct current from the plurality of voltage sources formed by the dual converter; and
converting the direct current into a number of alternating currents using the inverter.

13. The method of claim 12, wherein supplying the inverter the direct current from the plurality of voltage sources formed by the dual converter comprises:
    supplying the inverter a first direct current provided by the first voltage source; and
    supplying the inverter a second direct current provided by the second voltage source.

14. The method of claim 12 further comprising:
    controlling a duty cycle of the first converter and a duty cycle of the second converter to improve a quality of the number of alternating voltages formed by the inverter by reducing low-frequency voltage ripples in the voltage levels of the plurality of voltage sources.

15. The method of claim 12, wherein converting the direct current into the number of alternating currents using the inverter comprises:
    converting the direct current into the number of alternating currents using one of a three-phase inverter and a single-phase inverter.

16. The method of claim 12 further comprising:
    blocking higher-frequency electromagnetic interference in the inverter using a choke located between a set of capacitors and a load in the inverter.

17. The method of claim 12 further comprising:
    blocking higher-frequency electromagnetic interference in the inverter using a choke located between a set of capacitors and a set of inductors in the inverter.

* * * * *